US006680602B2

(12) United States Patent
Iyoda et al.

(10) Patent No.: US 6,680,602 B2
(45) Date of Patent: Jan. 20, 2004

(54) REACTIVE POWER COMPENSATOR

(75) Inventors: Isao Iyoda, Tokyo (JP); Koji Temma, Tokyo (JP); Katsuhiko Matsuno, Tokyo (JP); Yoshinao Matsushita, Osaka (JP)

(73) Assignees: Mitsubishi Denki Kabushiki Kaisha, Tokyo (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 10/199,133

(22) Filed: Jul. 22, 2002

(65) Prior Publication Data
US 2003/0122528 A1 Jul. 3, 2003

(30) Foreign Application Priority Data
Dec. 28, 2001 (JP) ........................................ 2001-401165

(51) Int. Cl.[7] ................................................. G05F 1/70
(52) U.S. Cl. ....................................... 323/207; 323/255
(58) Field of Search ................................ 323/207, 255, 323/205

(56) References Cited
U.S. PATENT DOCUMENTS
5,485,075 A * 1/1996 Mori et al. ................. 323/207

OTHER PUBLICATIONS

Shimado et al.; Statcom voltage control taking the transformer tap control in consideration, Articles 4–093 of National Convention of the Japan Institute of Electrical Engineers(JIEE) 2000.

* cited by examiner

*Primary Examiner*—Shawn Riley
(74) *Attorney, Agent, or Firm*—Leydig, Voit & Mayer, Ltd.

(57) ABSTRACT

When a voltage of a system is stabilized by connecting the system with two types of voltage regulators, i.e., a slow-response tap-changing transformer and a quick-response reactive power regulator, it is not always clear how characteristics of the reactive power regulator should be regulated. Moreover, the regulation takes much time. In a range where voltage fluctuation of the system is small and a tap-changing transformer can cope with the change, gain of a reactive power regulator is set to be low, and its output is restrained. In a range where voltage fluctuation of the system is large and the voltage deviates from a width of a dead zone of the tap-changing transformer, gain of the reactive power regulator is set to be high, and regulating current is fully utilized.

14 Claims, 8 Drawing Sheets

| item | | Range |
|---|---|---|
| Level of Vt between G1,G2 | | |
| | Upper point | Vref+(70/100)VD ~ Vref+(150/100)VD |
| | Lower point | Vref-(150/100)VD ~ Vref-(70/100)VD |
| Gain G1 | | (5/100 ~ 30/100) Iqmax/VD |
| Gain G2 | | G1 ~ 20·G1 |

FIG. 3

REACTIVE POWER COMPENSATOR

BACKGROUND OF THE INVENTION

1. Field of the Invention

The present invention relates to an improved reactive power compensator effective in stabilizing voltage of a system.

2. Description of Related Art

From the viewpoint of stably supplying electric power from a generator or a transformer (as well as a power plant or a substation, hereinafter collectively referred to as a power unit) to a load, it is extremely important to keep the voltage supplied to the load within a predetermined range. It is a matter of course that any output voltage of the power unit is controllable in most cases. However, there may be a voltage drop due to distribution line and transformer provided on the midway. In particular, when a system is operated in cooperation with another system, it is not always possible to regulate the voltage from the viewpoint of the cooperation with another system, and consequently, the voltage supplied to the load fluctuates in some case.

Hitherto, equipment for regulating the voltage of the system has been used in the form of being interposed midway in the system (hereinafter referred to as voltage regulator for convenience of explanation) in order to minimize such voltage fluctuation. Typical equipment capable of discontinuously changing the voltage (regulating the voltage to a discrete value with a difference between one value and another by a predetermined width) such as tap-changing transformer has been already proposed as such equipment.

FIG. 7 is a flow diagram for explaining constitution and operation of a system including such a conventional voltage regulator In the drawing, reference numeral 15 is a power unit of the system. Specifically, the power unit can be a single generator or an output transformer of a substation. Numeral 16 is a system impedance of the power unit 15, a distribution line connected to the power unit 15 etc., and the impedance is shown as lumped impedance for convenience of explanation. Numeral 17 is a tap-changing transformer with a tap control 17a, which is an example of the voltage regulator, added on a secondary side. Numeral 20 is a reactive power compensator connected to the secondary side of the tap-changing transformer 17, and numeral 21 is a load.

On the supposition that:

Vo is a voltage of the power unit 15,

Is is a power supply current flowing through the impedance 16,

Vs is a voltage on the primary side of the tap-changing transformer 17,

Vt is a voltage on the secondary side of the tap-changing transformer 17 (or a voltage of the load 21 in some cases), 1 to k is a transformation ratio (when a reference voltage is outputted) of the tap-changing transformer 17, I is an electric current flowing through the load 3, and Iq is a compensation current of the reactive power compensator 20;

the electric current Is of the power supply flowing through the impedance 16 is a value obtained by subtracting the compensation current Iq of the reactive power compensator 20 from the load current I flowing through the load 21 and multiplying the remainder value by the tap ratio k of the tap-changing transformer 17.

That is, $Is=(I-Iq)\cdot k$ (1)

The load voltage Vt is obtained as follows:

$$Vt=(Vo-X\cdot Is)\cdot k$$
$$=\{Vo-k(I-Iq)\}\cdot k \quad (2)$$

Now, voltage stabilization operation of the system in FIG. 7 is hereinafter described. To simplify the explanation, in the description, it is supposed that the load 21 is of a complete inductive load.

For better understanding, the systematic diagram in FIG. 7 is shown in FIG. 8 in the form of a block diagram showing the relation between the load terminal voltage Vt and the load current I etc. The operation of the tap control 17a is publicly known and detailed description of the operation is omitted herein. Fundamentally, as shown in FIG. 9, the operation includes decrease in voltage when the load voltage Vt is exceeding a voltage Vmax that was set at a value higher than a reference voltage Vref, or increase in voltage when the load voltage Vt is lower than Vmin set on the lower side. At this time, the tap voltage of the tap-changing transformer 17 is preliminarily set so that both of the value after the voltage increase and the value after the voltage decrease may come within the range of Vmax to Vmin. Vmax and Vmin are referred to as boundary voltage, and the zone between Vmax and Vmin is referred to as dead zone.

FIG. 10 is a characteristic graph showing the relation between the load current I and the terminal voltage Vt of the load 21. For better understanding, first, operation of the system is hereinafter described on the supposition that the reactive power compensator 20 is not connected (i.e., Iq=0).

It is herein supposed that the reference voltage Vref of the tap change operation of the tap control 17a is equal to the voltage Vo of the power supply 15 and a point A in FIG. 10 (when the load current I=0 and Vt=Vref) is an initial condition. When the load current I is 0, the load voltage Vt is Vo equal to the foregoing reference value of the tap change operation. Therefore, when increasing the load current I, the primary side voltage Vs of the tap-changing transformer 17 drops from the power supply voltage Vo by X·Is, and the load voltage Vt also drops on the right side region of the point A (on the side region where the load current I increases) as shown in FIG. 10. At this point, if k=1, the dropped voltage is obtained based on the foregoing expression (2) as follows:

$$Vt=Vo-X\cdot Is \quad (3)$$

Then, if Vt continues to further drop to be lower than the voltage Vmin which is lower than Vref by the width VD of the dead zone possessed by the tap control 17a as its characteristic (for example, when a quantity S obtained by time integration of a quantity deviated from Vmin comes to reach a predetermined quantity Sref, as described later in detail), the tap control 17a changes the tap position of the tap-changing transformer 17 by one stage toward the voltage increase side. Thus, as indicated by the point B in FIG. 10, Vt increases within a range not reaching Vmax.

When I increases further, Vt drops to reach Vmin again, the tap position is changed again, and Vt increases again. Such an operation will be repeated to the limit of the tap position.

Though not describing in detail, in the case that the load current I flows in the reverse direction (in power regeneration direction) and the load voltage Vt increases, the fundamental operation is the same. There is a difference only in the aspect that the operating voltage of the tap control 17a is changed to the Vmax side and the voltage comes to drop at the operating point. In this case, the voltage is dropped within the range not reaching Vmin as a matter of course.

Described hereinafter is the case in which the reactive power compensator 20 is connected. To simplify the explanation, in the following description, it is supposed that I is 0 and Vt=Vref=Vo under the initial condition in the same manner as in the foregoing description of the case without the reactive power compensator 20.

When K=1, the power supply current Is becomes (I−Iq), and therefore Is is small as compared with the case without the reactive power compensator 20 by a compensation current of the reactive power compensator 20. Accordingly, the voltage drop (X·Is) caused by the systematic impedance X becomes small, and drop in Vs is not so large, and the drop of Vt is also small as much. In the case that the reactive power compensator 20 is used in order to stabilize the voltage, this principle is used to keep the load voltage Vt.

In general, as shown in FIG. 11, the output current Iq of the reactive power compensator 20 is a value obtained by multiplying a difference between an operating reference voltage Vtref set in the reactive power compensator 20 and the load voltage Vt by a gain G. Under the initial condition, supposing that the voltage command value Vtref of the reactive power compensator 20 is equal to Vref, there is no difference between Vtref and Vt, and therefore Iq is 0. Iqlimit indicated in the drawing is a current limit value (limiter) generally set for the purpose of protecting the apparatus, and the foregoing description is reasonable within this range.

When increasing I, Vt drops. Then, the current Iq that is a result of multiplying the difference between Vtref and Vt by G is supplied to the system.

Vt is, as shown in the expression (2), $$Vt = k\{Vo - X \cdot k \cdot (I - Iq)\}$$

where:

Iq=(Vtref−Vt)·G k=1

Vtref=Vref=Vo

Substituting the above expressions for (2) and arranging them, $$\begin{aligned} Vt &= Vo - X \cdot \{I - Iq\} \quad (4)\\ &= Vo - X \cdot I + X \cdot Iq \\ &= Vo - X \cdot I + X \cdot G(Vtref - Vt) \\ Vt + Vt \cdot X \cdot G &= Vo - X \cdot I + X \cdot G \cdot Vtref \\ Vt(1 + XG) &= Vo - X \cdot I + X \cdot G \cdot Vo \\ Vt &= \{Vo(1 + XG) - XI\}/(1 + XG) \\ Vt &= Vo - X \cdot I/(1 + XG) \end{aligned}$$

As compared with the foregoing expression (3) of voltage in the case without the reactive power compensator 20, the drop ratio of Vt to the increase in I is reduced to 1/(1+XG). FIG. 12 shows variation in the load voltage Vt with respect to variation in the load current I, and the outputting manner of the output current of the reactive power compensator 20. The left end of this graph indicates a limit of the tap change.

In general, it is possible to set a large value for G, and therefore within the range of control of the reactive power compensation (within the range of change in Iq shown in FIG. 12), the drop of Vt is extremely small (the Vt characteristic declines slightly in FIG. 12). However, as the reactive power compensator 20 is comprised of power semiconductors in most cases, Iq cannot be increased exceeding a limit value Iqmax fixed in accordance with a capacity of the apparatus. Once reaching Iqmax (point C in FIG. 12), Iq is fixed to Iqmax and therefore $$Vt = Vo - X \cdot I + X \cdot Iqmax \quad (5)$$

At this time, values of Vo and X·Iqmax are fixed, and therefore Vt gradually drops with the same inclination in the expression (3) showing the case without the reactive power compensator 20. When Vt comes to less than the operating value Vmin on the increase side of the tap control of the transformer, the tap position is changed, Vt increases, and Iq decreases. When further increasing I, Vt drops again and Iq comes to increase.

In order that the reactive power compensator 20 may operate as described above, it is necessary that a parameter thereof is set correctly. However, the tap-changing transformer 17 and the tap control 17a have various characteristics depending upon their capacities and the state of the system at an insertion point, and therefore the parameter cannot be set correctly until the position for connecting the reactive power compensator 20 in the system is fixed and the characteristics of the connected tap control 17a etc. are made clear. After all, correct setting of parameter must be carried out at the working site, hence a problem exists in that the setting requires much time.

Basically, the tap change is slow in response and can cope with only slow fluctuation in system voltage, while the reactive power controller is quick in response and can cope with sharp fluctuation in system voltage, and therefore the setting needs to be arranged making the best use of such characteristics. However, in the case of the characteristic shown in FIG. 12, it is considered that, in most cases, the reactive power compensator 20 outputs a reactive power to regulate the voltage and is operated under the maximum value of the output of the reactive power compensator (i.e., from the point C to a point D in FIG. 12), before tap control is performed with respect to the fluctuation in the system voltage Vt. In such a case, if any condition of the system varies suddenly and the voltage fluctuation takes place too quickly to respond by the tap change control, it is not possible to urgently generate reactive power to stabilize the system voltage because the output of the reactive power compensator 20 is already at maximum and cannot be increased any more. To cope with this, for example, in the "Static Var Compensator (STATCOM) voltage Control Method in Consideration of Transformer Tap" made public at the Annual National Convention 2000 of the Institute of Electrical Engineers of Japan (IEEJ), a gain G of STATCOM being a type of reactive power compensator is changed into two stages. That is, G is changed to G1, which is a low gain, when voltage deviation is small, and G is changed to G2, which is a high gain, when the voltage deviation increases to a certain degree.

In this method, when the voltage deviation remains within a certain range, the output of the reactive power compensator 20 never reaches the maximum value, and it is said possible to cope with a case in which it is necessary to further abruptly change the reactive power. However, it is not always defined that the value of G should be set within a specific voltage deviation range and at a specific level, and therefore the setting must be performed on a trial and error basis, thus a problem still exists in that the setting requires much time.

In the conventional reactive power compensator of above-described arrangement, a problem exists in that the setting is impossible unless the characteristics of the connected tap-changing transformer etc. are clear.

It is certain that a method has been proposed for covering fluctuation in the load current I to a certain extent within a range of tap change and also covering fluctuation too transient and large to respond by the tap change. But, it is not always defined how the gain should be set, and therefore the setting must be performed on a trial and error basis, thus a problem still exists in that the setting requires much time.

SUMMARY OF THE INVENTION

The present invention has been made to solve the above-discussed problems and has an object of providing a reactive power compensator in which a method of setting a parameter of the reactive power compensator is defined, a time required for setting the parameter is shortened, and the setting is automatized.

A reactive power compensator according to the invention has a computing unit that is connected to an output side of a voltage regulator connected to a power system. And in the voltage regulater a voltage to be supplied to a load deviates from a dead zone having boundary voltages each above and below a predetermined reference value, the voltage is regulated to be predetermined discrete values each different by a predetermined width, and calculates an electric current by multiplying a difference between the voltage load and the reference value by a gain calculated on the basis of the boundary voltages or the predetermined discrete value.

And the calculated electric current is inputted to and outputted from the power system. And the gain includes at least two stages of gains (a first and a second gain).

The first gain is used at the time when the voltage of the system is within the dead zone or outside the dead zone and in the vicinity of one of the boundary voltages.

The second gain is used at the time when the voltage of the system is outside the dead zone and is not in the vicinity of the boundary voltages.

The second gain is larger than the first gain and smaller than twenty times the first gain.

As a result, the output is restrained to be within a certain level capable of securing a control margin.

Using the secured control margin to overcome the sudden fluctuation in the system voltage makes it possible to obtain a broader voltage stabilization characteristic.

BRIEF DESCRIPTION OF THE SEVERAL VIEWS OF THE DRAWINGS

FIG. 3 shows ranges of variation in characteristics according to Embodiment 2.

DETAILED DESCRIPTION OF THE INVENTION

Embodiment 1

Figure 1:
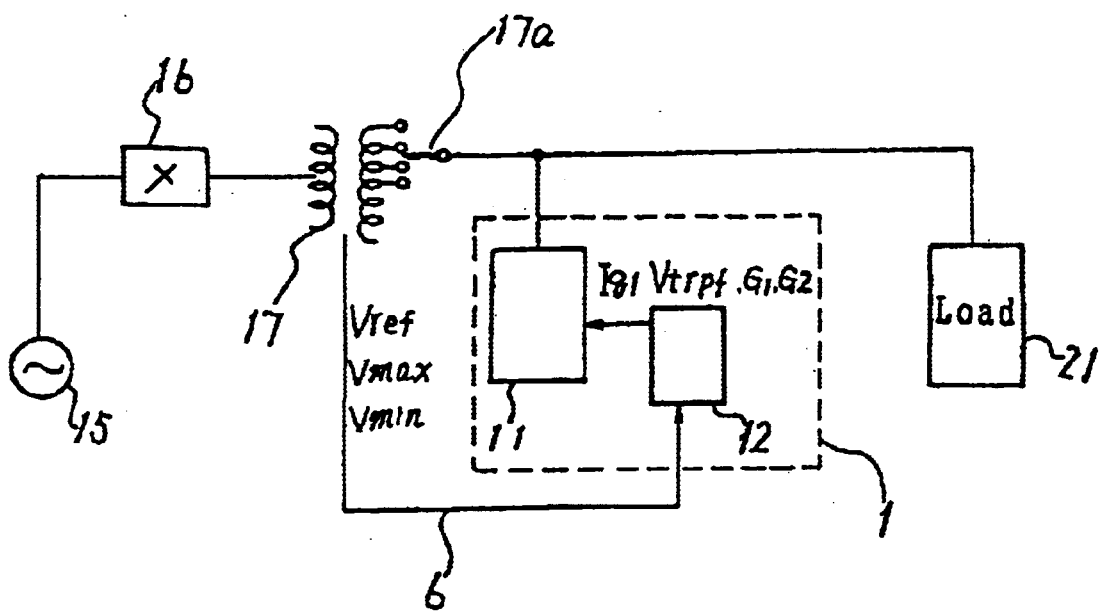
FIG. 1 is a system diagram in which a reactive power regulator according to Embodiment 1 of the invention is used.

A reactive power compensator according to Embodiment 1 of the invention is hereinafter described with reference to the system diagram in FIG. 1. In the drawing, the same numerals are designated to the same or like parts as those in the conventional reactive power compensator, and detailed explanation of them is omitted herein. Numeral 1 is a reactive power compensator according to the invention. The reactive power compensator 1 comprises a body 11 of the reactive power compensator and a first computing unit 12. The first computing unit 12 calculates and outputs a current value Iq at a switch point of a gain of the reactive power compensator body 11, a voltage set value Vt, etc. (described later), on the basis of set values (an operating reference voltage Vref, a tap change down voltage Vmax, a tap change up voltage Vmin, etc.) of a tap control 17a described later.

Numeral 15 is a power supply of a system, which can be a single generator or an output transformer of a substation. Numeral 16 is system impedance of the power supply 15, a distribution line connected with the power supply 15, etc., and the impedance is indicated in the form of lumped impedance for convenience of explanation. Numeral 17 is a tap-changing transformer with the tap control 17a, which is an example of a voltage regulator, attached on a secondary side, and numeral 21 is a load.

Numeral 6 is transmitting means for transmitting the current set values of the foregoing tap control 17a to the first computing unit 12 of the reactive power compensator 1, and the transmitting means is, for example, a transmission line for transmitting signals as data.

Figure 2A:
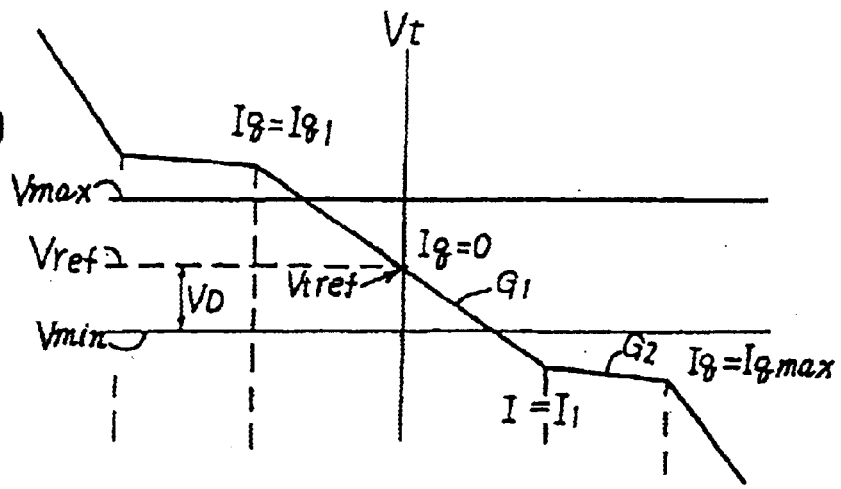
FIGS. 2(a) and 2(b) are characteristic diagrams in relation of FIG. 1.
Figure 2B:
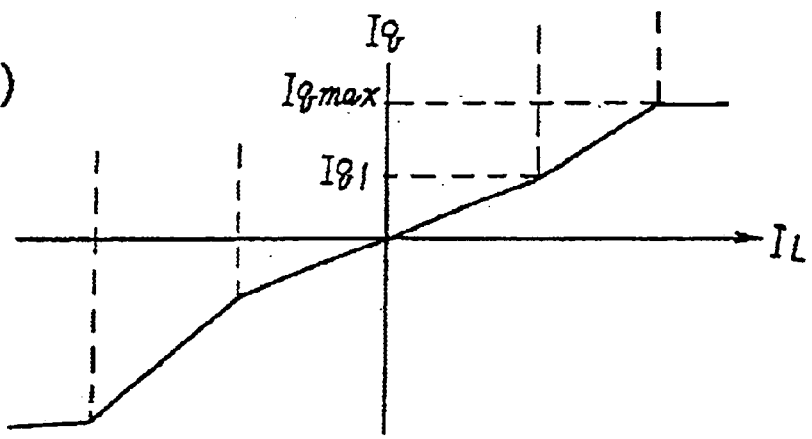

Now, operation is described. First, FIG. 2(a) shows a characteristic of variation in the load voltage Vt with respect to a load current I in the invention, and FIG. 2(b) shows an output current value of the reactive power compensator 20 corresponding to FIG. 2(a). An example of basic parameter setting is hereinafter described with reference to FIGS. 2(a) and 2(b). In FIG. 2(a), a voltage set value Vtref of the reactive power compensator 1 is set at the same value as the voltage reference value Vref of the tap control 17a of the transformer. Then, an approximate percentage of an allowable output, to which a maximum value (Iq1) of the output in the steady state (not including the time when the voltage fluctuates suddenly such as transient time) of the reactive power compensator 1 should be restrained, is decided. For example, on the supposition that the percentage is 10%, $$Iq1 = (10/100) \cdot Iqmax$$

Then, within a range where tap change control of the transformer is normal (within the range of a dead zone), a gain G1 is set such that an output current of the reactive power compensator 1 may be kept at a level not exceeding this Iq1.

The gain G1 is defined by Iq=G1·(Vref−Vt).

The gain G1 is further set such that Iq may be not larger than Iq1 when Vt reaches Vmin. That is, $$G1 \cdot (Vref - Vmin) \leq Iq1 \quad (6)$$

$$G1 \leq Iq1/(Vref - Vmin) \quad (7)$$

Expression (7) is also expressed as follows:

$$G1 \leq Iq1/VD \quad (8)$$

If setting G1 to be with in the range of satisfying the expression (8), Iq increases when the load terminal voltage Vt drops. However, when Vt drops to Vmin, the value of Iq is still smaller than the value of Iq1. Accordingly, tap control of the transformer comes to operate thereby transformer tap changes, and consequently, Vt increases while Iq decreases. By setting like this, a switch point between G1 and G2 is located on the lower side of the operating limit voltage Vmin of the transformer tap control. In this arrangement, increase in Iq does not exceed 10% of Iq1, i.e., Iqmax under normal conditions. Consequently, when variation in the voltage is too abrupt to respond by the slow-response tap control, the reactive power compensator 1 rapidly increases Iq of the remaining 90%, thereby restraining fluctuation in the load terminal voltage.

It is preferable that each characteristic constant obtained by the computation is delivered to the reactive power compensator 1 to be automatically set. It is also preferable that an operator reads the numeral values obtained by the computation and manually sets them again as a matter of course.

In the foregoing description, an example of increasing in the load current I while decreasing in Vt is described. In the case of decrease in the load current I and increase in Vt, only the polarity in the operation is changed and the remaining operation is the same as a matter of course. However, it is not always required that the characteristic on the side where the electric current increases is coincident with the characteristic on the side where the electric current decreases as described in the foregoing description. It is possible to obtain a certain effect only with either the higher side or the lower side. Also in the foregoing description, it is described that Vref is supposed to be in the middle between Vmax and Vmin. In this case, a gain (indicated by G11) on the side where Vt increases can be the same value as the gain G1 on the decreasing side. However, in the case that Vref is not in the middle between Vmax and Vmin (i.e., in the case that Vref is biased), it is necessary to use the following expression instead of G1.

$$G11 \leq Iq1/(Vmax - vref) \quad (9)$$

where: the voltages Vmax and Vmin in which the tap control is switched are boundary voltages. The gain G1 is a first gain, and the gain G2 is a second gain. The tap-changing transformer 17 is a voltage regulator.

Embodiment 2

In the foregoing Embodiment 1, the optimum set value for the level of the gain G1 within the range of the dead zone is described. However, there is an allowable range in such a set value and it is possible to obtain a certain effect even when a different value is set. Such an allowable range is hereinafter described in this Embodiment 2.

As shown in FIG. 2, it is preferable to set the switch point (break point) between the gain G1 and the gain G2 at a point deviating from the range of the dead zone (Vmin to Vmax). On the contrary, it is also preferable to set the break point inside the dead zone. In the case of setting the break point inside the dead zone, the gain is changed to the gain G2 when the voltage fluctuation exceeds the voltage of the break point and the reactive power compensator strengthens voltage fluctuation restraint. Therefore, a voltage fluctuation input to the voltage regulator is restrained, thereby its operation being also restrained. During this period, the state of large output from the reactive power compensator continues, and it is impossible to achieve the purpose of the invention. Therefore, it is essential to set the break point at a point deviating from the dead zone. In this case, if the break pint is located too far from the dead zone, the gain of the reactive power compensator is the low G1 until reaching the break point, and the reactive power compensator cannot perform its function, i.e., a high-speed and high-gain voltage fluctuation restraining function.

Therefore, a preferable range is to set the lower break point within the range from Vref−(150/100) VD to Vref−(70/100) VD, and set the higher break point within the range from Vref+(70/100) VD to Vref+(150/100) VD.

The gain G1 within these ranges described in the expression (8) in the foregoing Embodiment 1 is G1≤Iq1/VD=(10/100) Iqmax/VD, while it is also possible to obtain a sufficient effect within the range of (5/100) Iqmax/VD≤G1≤(30/100) Iqmax/VD.

As for the gain G2, it is necessary that the gain G2 is larger than the gain G1 as a matter of course, and it is preferable that the gain G2 is not more than approximately twenty times G1.

For better understanding, FIG. 3 shows the foregoing ranges of the gains, etc.

Embodiment 3

A reactive power compensator according to Embodiment 3 is hereinafter described.

The reactive power compensator 1 shown in FIG. 1 according to the foregoing Embodiments 1 and 2 receives signals such as Vref, Vmax, Vmin, etc. necessary for the change control from the tap-changing transformer 17. On the basis of these signals, operating conditions of the reactive power compensator 1 are decided. However, the reactive power compensator is not always disposed in the vicinity of the tap-changing transformer 17 (it is often the case that the reactive power compensator is disposed in the vicinity of the load 21). Therefore, there is a problem that the transmitting means 6 for transmitting the foregoing signals cannot be easily disposed from the economical viewpoint in some cases.

To solve such a problem, a reactive power compensator according to this embodiment is arranged so as not to require any transmission of the mentioned signals.

Figure 4:
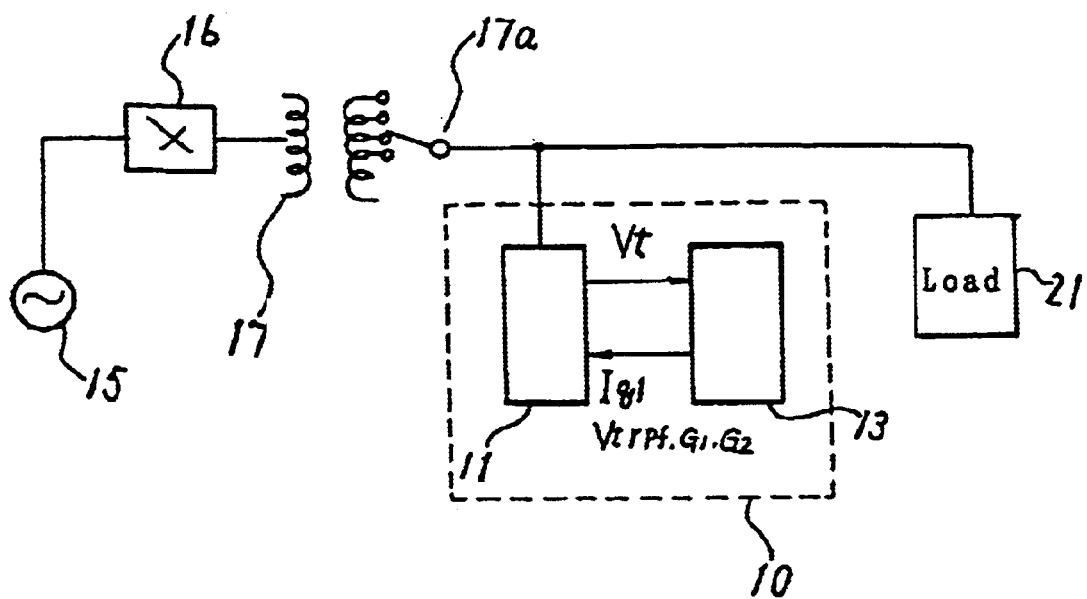
FIG. 4 is a system diagram according to Embodiment 3 of the invention.

FIG. 4 shows a diagram of a power system using the reactive power compensator 10 according to this embodiment. In the drawing, the same reference numerals are designated to the same parts as those in the arrangement of FIG. 1 showing the foregoing Embodiment 1, and further description of them is omitted.

Numeral 10 is a reactive power compensator according to Embodiment 2, numeral 11 is a reactive power compensator body. Numeral 13 is a second computing unit for supposing a set value of a tap control 17a on the basis of variation in the load voltage Vt, calculating a gain G1 in the case of small deviation between load voltages Vt and Vref, a gain G2 in a case of large deviation, a current value Iq1 at the switch point of the gains, a voltage set value Vref, etc., and outputting those values to the body 11 of the mentioned reactive power compensator 10. The second computing unit may be integrally incorporated in the body 11 as one function of the controller of the reactive power compensator body 11 in some cases. However, for convenience of explanation, they are separated from each other in this description. The body 11 and the second computing unit 13 form the reactive power compensator 10 in this Embodiment 3.

Figure 5:
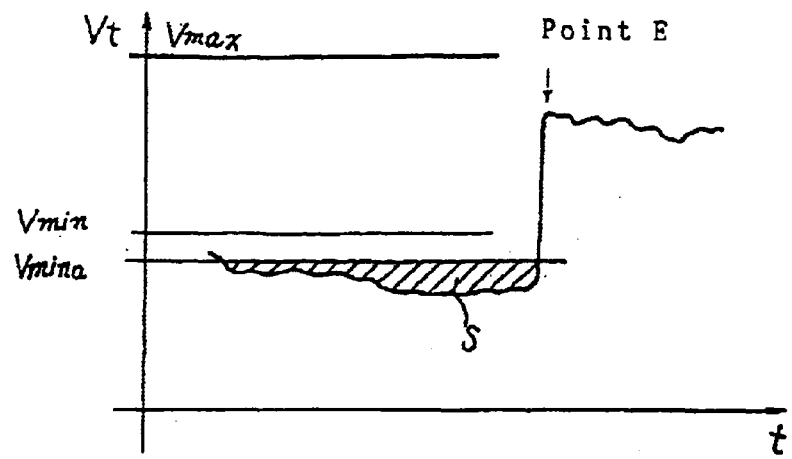
FIG. 5 is a diagram for explaining fluctuation in load voltage and deviation integration.

How the second computing unit 13 obtains the operating set values of the tap-changing transformer 17 through calculation without being informed of them as transmitted information is hereinafter described by way of an example referring to a diagram of variation in the load voltage shown in FIG. 5. Generally, in tap control of the transformer, when the load voltage Vt deviates from the dead zone width (not more than Vmax or not less than Vmin), the deviation quantity is subject to time integration. The tap is changed when the value S obtained by time integration exceeds a fixed value as shown in FIG. 5. Accordingly, in the case that the voltage fluctuates abruptly (abrupt increase in this example) as indicated by the point E in FIG. 5 during monitoring the load voltage Vt, it is considered that the tap has been changed up. Therefore a lower limit value Vmina of the dead zone width is supposed, and value S obtained by time integration of the deviation quantity from the time when Vt reached Vmina before the point E up to the point E when the tap control started is calculated.

Figure 6:
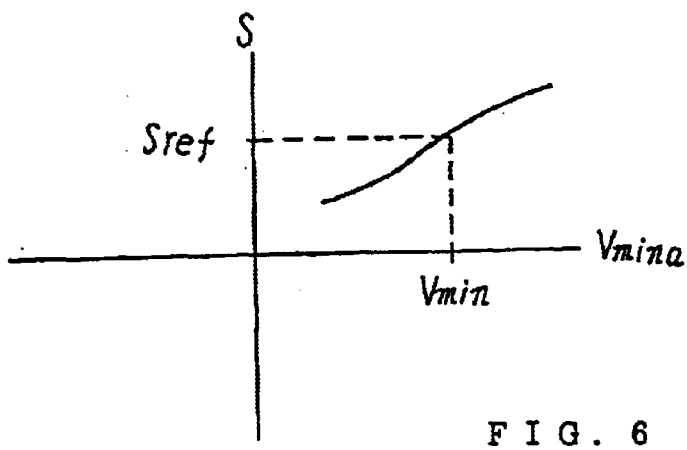
FIG. 6 is a diagram for explaining a method of deciding numerical value through deviation integration.
Figure 7:
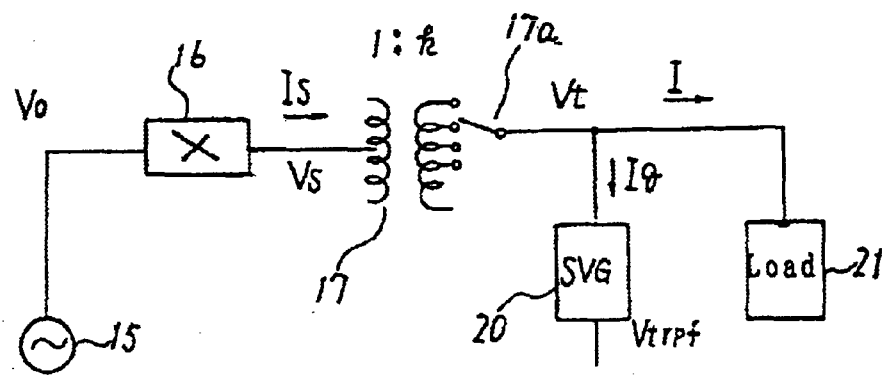
FIG. 7 is a flow diagram showing an example of arrangement of a conventional system.
Figure 8:
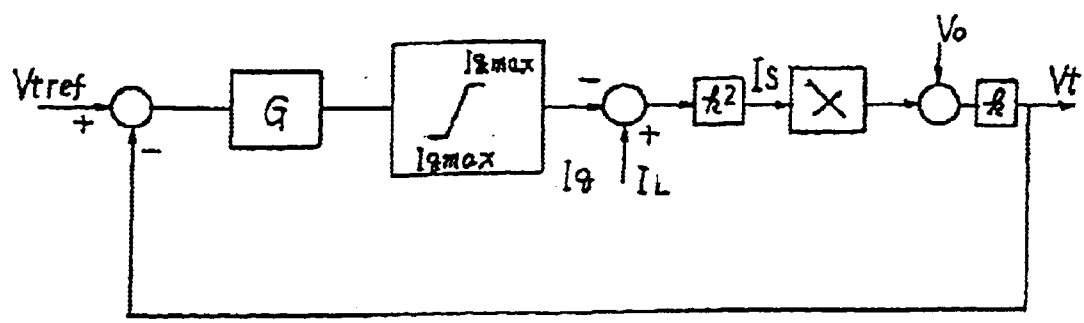
FIG. 8 is a transfer function block diagram for explaining a function of controlling voltage of the reactive power compensator.
Figure 9:
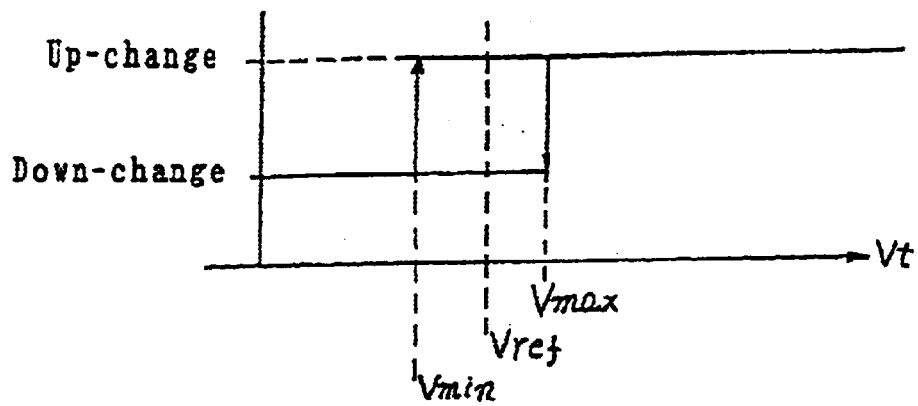
FIG. 9 is a characteristic diagram of voltage control by means of a single transformer with tap control.
Figure 10:
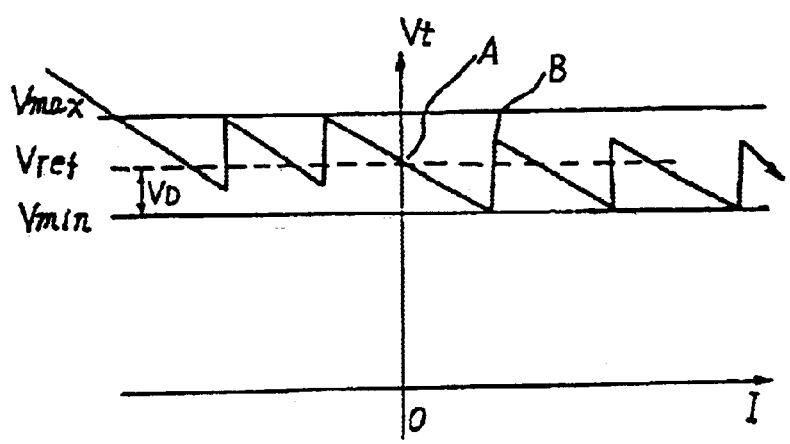
FIG. 10 is a control characteristic diagram of the system voltage of the transformer with tap control.
Figure 11:
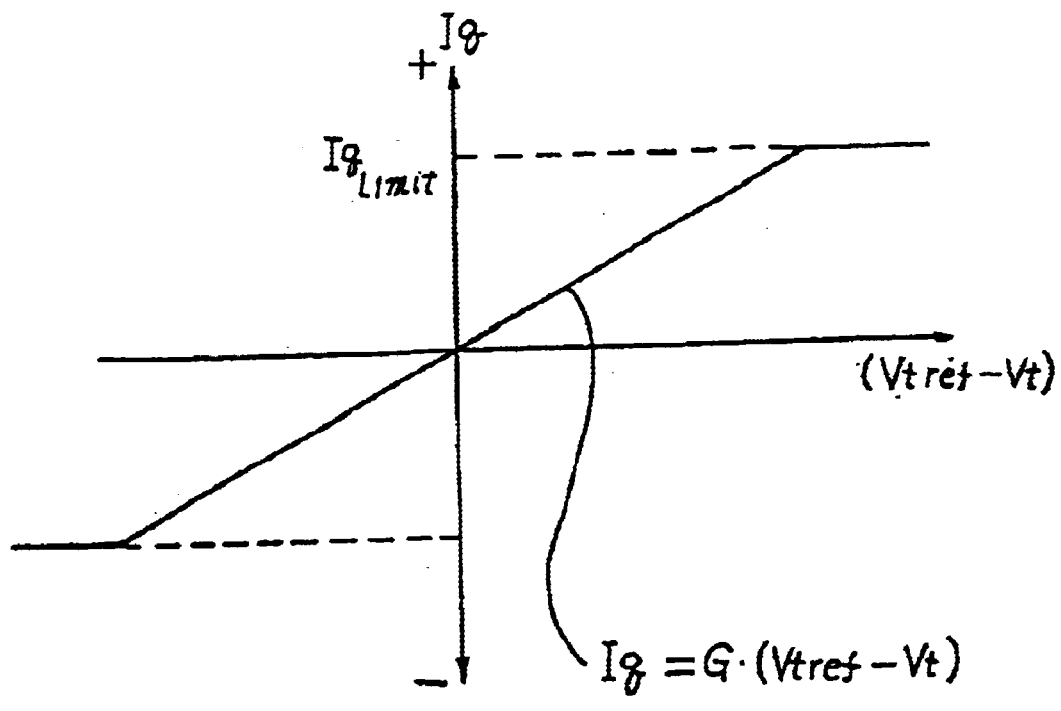
FIG. 11 is a voltage control characteristic diagram of a conventional reactive power compensator.
Figure 12:
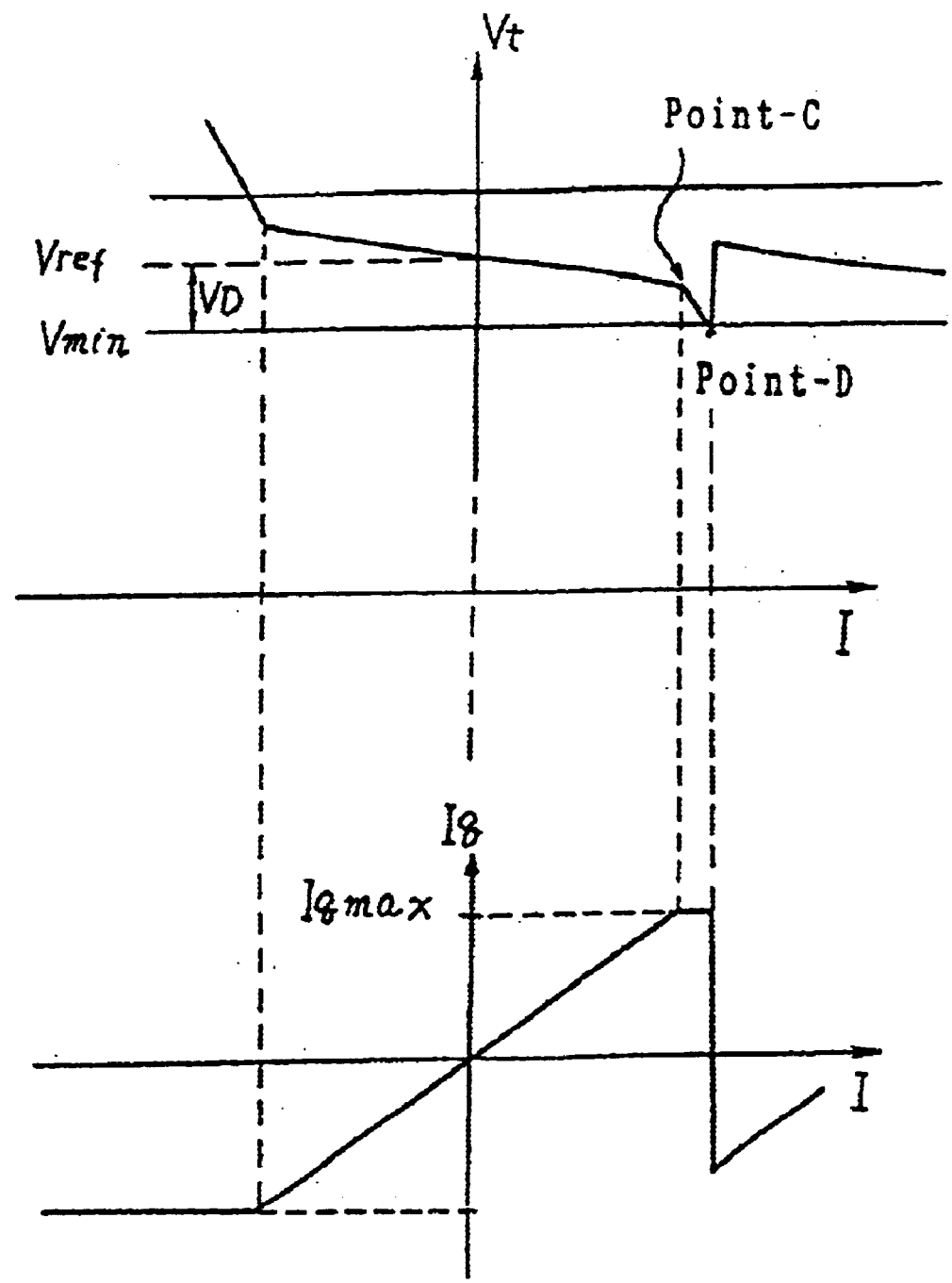
FIG. 12 is a voltage control characteristic diagram of the system in which the transformer with tap control and the conventional reactive power compensator are combined.

In general, a predetermined quantity Sref obtained by time integration of a deviated quantity until the operation starts is fixed as a standard regardless of the type and capacity of transformer, and therefore it is preferable that the quantity Sref is preliminarily stored in the second computing unit 13. When changing the supposed value Vmina and recalculating S, a functional curve as shown in FIG. 6 is obtained putting S as a function of Vmina and it is therefore possible to calculate Vmina where S=Sref.

This is the lower limit value Vmin of the dead zone of the tap control 17a.

The dead zone width VD is also standardized in general and can be calculated as Vref=Vmin+VD on condition that Vmin is definite. In the same manner, Vmax can be also obtained.

By performing these calculations at all times, Vmin, Vref, and Vmax are calculated. Then, using these values, the gain G1 of the reactive power compensator in the case that the voltage deviation is small, the gain G2 in the case that the voltage deviation is large, the current value Iq1 of the switch point of the gains, the voltage set value Vtref, etc. are respectively calculated and outputted to the mentioned body 11. It is a matter of course that appropriate setting point in the ranges described referring to FIG. 3 of Embodiment 2 should be preliminarily selected and given to the second computing unit 13 by the operator considering the property of load, power condition of the site, etc.

The transformer 17 with tap control mentioned in the description is not limited to this, and it is a matter of course that the invention is applicable to any other voltage control device that is discrete voltage controlling means for controlling the dead zone.

What is claimed is:

1. A reactive power compensator comprising:
a computing unit, connected to an output side of a voltage regulator connected to a power system in which every time a voltage to be supplied to a load connected to the output side deviates from a dead zone having boundary voltages above and below a predetermined reference value, the voltage is regulated to be one of a plurality of predetermined discrete values, each value being different by a predetermined amount, and calculating an electric current by multiplying a difference between the voltage to be supplied the load and the reference value by a gain calculated based on the boundary voltages or the predetermined discrete value, wherein the electric current calculated is input to and output from the power system, the gain includes at least two stages of gains comprising a first gain when the voltage of the system is within the dead zone or outside the dead zone and near one of the boundary voltages, and a second gain when the voltage of the system is outside the dead zone and not near the boundary voltages, the second gain being larger than the first gain and smaller than twenty times the first gain.

2. The reactive power compensator according to claim 1, wherein the voltage range of the system in which the gain is the first gain is a range obtained by adding 10/10 to 15/10 of a half of the dead zone to a median of the dead zone on a higher side of the median of the dead zone.

3. The reactive power compensator according to claim 1, wherein the voltage range of the system in which the gain is the first gain is a range obtained by subtracting 15/10 to 10/10 of a half width of the dead zone from a median of the dead zone on a lower side of the median of the dead zone.

4. The reactive power compensator according to claim 1, wherein, when the voltage of the system is near a median of the dead zone, the gain is within a range of 5/100 to 30/100 of a value obtained by dividing a maximum current value that can be output from said reactive power compensator by a voltage corresponding to the width of the dead zone.

5. The reactive power compensator according to claim 1, wherein said computing unit is a first computing unit that obtains the boundary voltages of the voltage regulator, width of the dead zone, or the discrete value for computation on the voltage regulator through communicating means.

6. The reactive power compensator according to claim 1, wherein said computing unit is a first computing unit that obtains the boundary voltages of the voltage regulator, width of the dead zone, or the discrete value for computation by a computation based on voltage fluctuation in the system.

7. The reactive power compensator according to claim 6, wherein said first computing unit obtains the boundary voltages by time integration of a difference between supposed boundary voltages and the voltage of the system over a predetermined time up to a point immediately before the voltage of the system fluctuates abruptly, and supposing the boundary voltages so that boundary voltage obtained by the time integration is coincident with a standard value obtained by the time integration and preliminarily input.

8. The reactive power compensator according to claim 1, wherein the voltage regulator is a tap-changing transformer.

9. The reactive power compensator according to claim 2, wherein, when the voltage of the system is near a median of the dead zone, the gain is within a range of 5/100 to 30/100 of a value obtained by dividing a maximum current value that can be output from said reactive power compensator by a voltage corresponding to the width of the dead zone.

10. The reactive power compensator according to claim 2, wherein said computing unit is a first computing unit that obtains the boundary voltages of the voltage regulator, width of the dead zone, or the discrete value for computation from the voltage regulator through communicating means.

11. The reactive power compensator according to claim 2, wherein said computing unit is a first computing unit that obtains the boundary voltages of the voltage regulator, width of the dead zone, or the discrete value for computation by a computation based on voltage fluctuation in the system.

12. The reactive power compensator according to claim 3, wherein, when the voltage of the system is near a median of the dead zone, the gain is within a range of 5/100 to 30/100 of a value obtained by dividing a maximum current value that can be output from said reactive power compensator by a voltage corresponding to the width of the dead zone.

13. The reactive power compensator according to claim 3, wherein said computing unit is a first computing unit that obtains the boundary voltages of the voltage regulator, width of the dead zone, or the discrete value for computation on the voltage regulator through communicating means.

14. The reactive power compensator according to claim 3, wherein said computing unit is a first computing unit that obtains the boundary voltages of the voltage regulator, width of the dead zone, or the discrete value for computation by a computation based on voltage fluctuation in the system.

* * * * *